US009008631B2

(12) United States Patent
Small et al.

(10) Patent No.: US 9,008,631 B2
(45) Date of Patent: Apr. 14, 2015

(54) PROVIDING CONTEXT INFORMATION DURING VOICE COMMUNICATIONS BETWEEN MOBILE DEVICES, SUCH AS PROVIDING VISUAL MEDIA

(75) Inventors: Andrea Small, Seattle, WA (US);
Sinclair Temple, Seattle, WA (US);
Patrick Carney, Seattle, WA (US);
Maura Collins, Seattle, WA (US);
Valerie Goulart, Seattle, WA (US);
Ming Ligh, Seattle, WA (US);
Georgiana Gormley, Durham, NC (US);
Jeff Gough, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 1075 days.

(21) Appl. No.: 12/434,518

(22) Filed: May 1, 2009

(65) Prior Publication Data

US 2010/0279666 A1 Nov. 4, 2010

(51) Int. Cl.
*H04M 1/57* (2006.01)
*H04M 1/725* (2006.01)
*H04M 3/42* (2006.01)
*H04L 29/06* (2006.01)

(52) U.S. Cl.
CPC .......... *H04M 1/576* (2013.01); *H04M 1/72569* (2013.01); *H04M 3/42042* (2013.01); *H04L 65/1096* (2013.01); *H04M 2203/2038* (2013.01); *H04M 2207/18* (2013.01); *H04L 65/1006* (2013.01)

(58) Field of Classification Search
None
See application file for complete search history.

(56) References Cited

U.S. PATENT DOCUMENTS

| 6,377,795 | B1* | 4/2002 | Bach et al. ................. 455/417 |
| 6,430,174 | B1* | 8/2002 | Jennings et al. ............. 370/352 |
| 7,424,310 | B1* | 9/2008 | Barbeau ..................... 455/556.1 |
| 7,587,039 | B1* | 9/2009 | Koch ........................ 379/211.01 |
| 8,041,401 | B2* | 10/2011 | Goldfarb .................... 455/567 |
| 2004/0240434 | A1* | 12/2004 | Sato et al. .................. 370/352 |
| 2005/0107074 | A1* | 5/2005 | Zellner ...................... 455/415 |
| 2006/0058049 | A1* | 3/2006 | McLaughlin et al. ........ 455/466 |
| 2008/0045138 | A1* | 2/2008 | Milic-Frayling et al. .... 455/3.04 |
| 2008/0122796 | A1* | 5/2008 | Jobs et al. ................... 345/173 |
| 2008/0242282 | A1* | 10/2008 | Kuhl et al. .................. 455/415 |

(Continued)

FOREIGN PATENT DOCUMENTS

EP 1528765 A1 5/2005
KR 20060108993 A 10/2006

OTHER PUBLICATIONS

Schmidt, Albrecht et al, "Context-Phonebook—Extending Mobile Phone Applications with Context," Proceedings of Third Mobile HCI Workshop, Sep. 2001, 6 pages.
International Search Report and Written Opinion for PCT/US2010/033275, Filed Date: Apr. 30, 2010, Applicant: T-Mobile USA, Inc., Mailing Date: Dec. 10, 2010, 11 pages.

*Primary Examiner* — Kent Chang
*Assistant Examiner* — Benjamin Morales Fernandez
(74) *Attorney, Agent, or Firm* — Perkins Coie LLP

(57) ABSTRACT

A system and method for providing context information along with a voice call is disclosed. In some examples, a calling device receives context information from a user and transmits the context information when establishing a voice call with the user. The context information may include various types of media, such as pictures or videos taken by a calling device. In some examples, a destination mobile device receives a voice call that does have context information and sends a request to a calling mobile device for information related to the voice call.

17 Claims, 7 Drawing Sheets

(56) References Cited

U.S. PATENT DOCUMENTS

2008/0273677 A1\* 11/2008 Alfano et al. ............. 379/93.17
2009/0022285 A1\* 1/2009 Swanburg et al. ......... 379/88.11
2009/0171568 A1\* 7/2009 McQuaide, Jr. ............. 701/206

\* cited by examiner

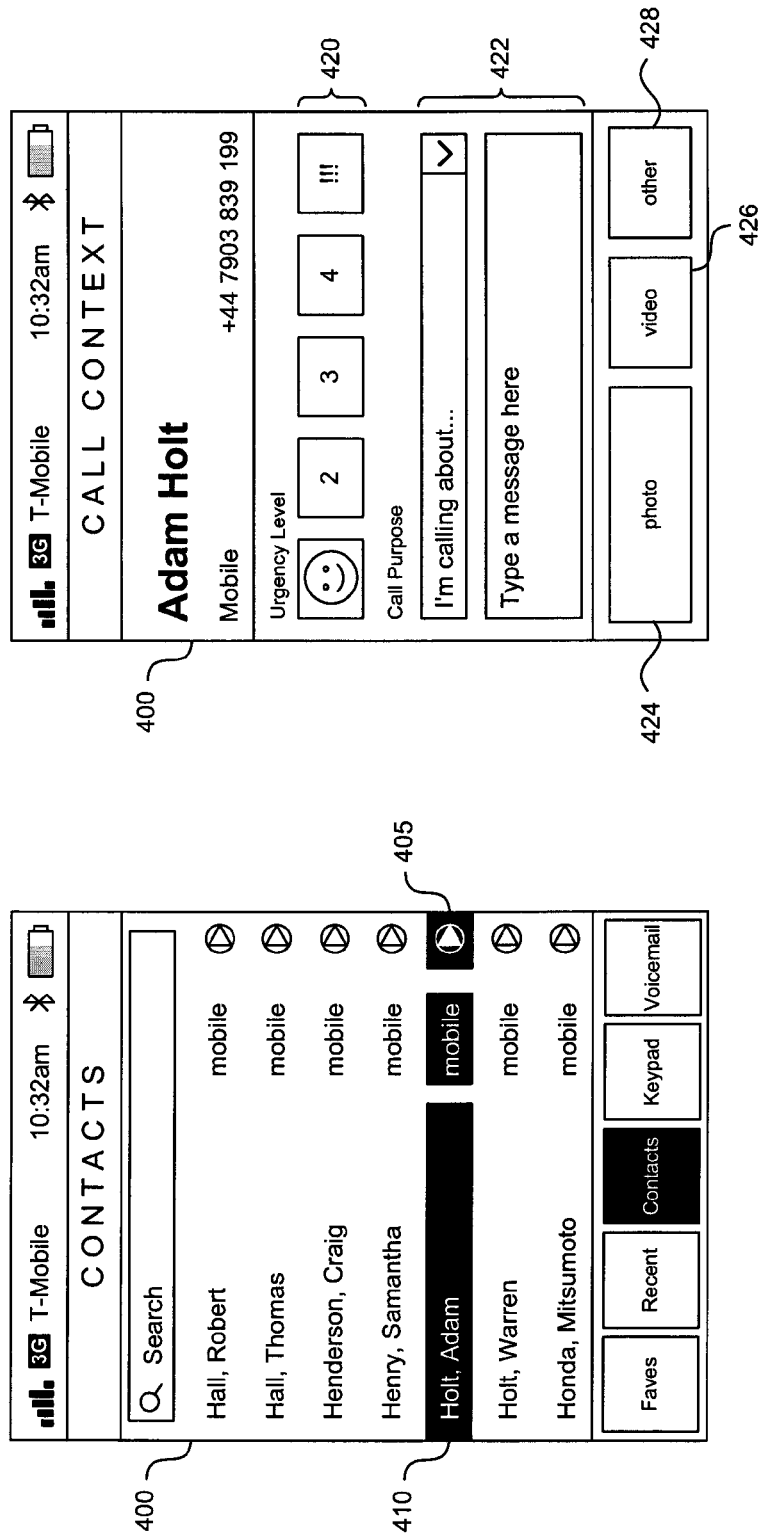

PROVIDING CONTEXT INFORMATION DURING VOICE COMMUNICATIONS BETWEEN MOBILE DEVICES, SUCH AS PROVIDING VISUAL MEDIA

BACKGROUND

In addition to providing traditional voice communications, mobile devices facilitate communications between people in a number of different ways: users can send email messages, send text and multimedia messages, chat with other users, and so on. In fact, many users have adopted these way as their primary channels of contact with other users, because they are simple, quick, and unobtrusive, among other reasons.

Mobile devices are ubiquitous and users typically carry them wherever they go. At times, however, a user may be otherwise occupied and would only want to receive urgent or important calls. However, it is often difficult for a user to ascertain the importance of a call until the user picks up the call, which can be burdensome when the call is not desired or critical. There is one system capable of transmitting text information along with a voice call, although the system is quite limited in capabilities, and may be unsuitable for many users. For example, although this system, disclosed in U.S. Published Patent Application No. 2008/0273677, provides data along with a voice call, it only discloses providing text information, such as in a subject line displayed by a phone.

The need exists for a method and system that overcomes these problems and progresses the state of the art, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 4A-4C are screen shots of representative interfaces displayed during establishment of a voice call between two mobile devices.

DETAILED DESCRIPTION

A system and method for presenting context information, such as photos, videos, and other multimedia, during establishment and/or reception of a voice call is described. Upon receiving a request to establish a voice call, the system may present a list or menu of types of content used to provide context or intention for the voice call. The types of content may be text-based content, visual content (such as photographs or videos), content automatically selected by the mobile device (such as content selected based on a location of the mobile device, the time of day, information received from other sources), and so on. Once a type of content has been selected (or input by the user), the system establishes a communication channel with a destination mobile device, and transmits the context information to the destination mobile device, providing a user of the destination mobile device with a context for the phone call.

In some examples, the system may facilitate a request for context information by a destination mobile device to a calling mobile device. Upon receiving a phone call, the system, via an interface of the destination mobile device, may present a list of options associated with the phone call, including an option to send a message back to a calling mobile device requesting context information about the voice call.

Various examples of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific examples of the system.

Figure 1:
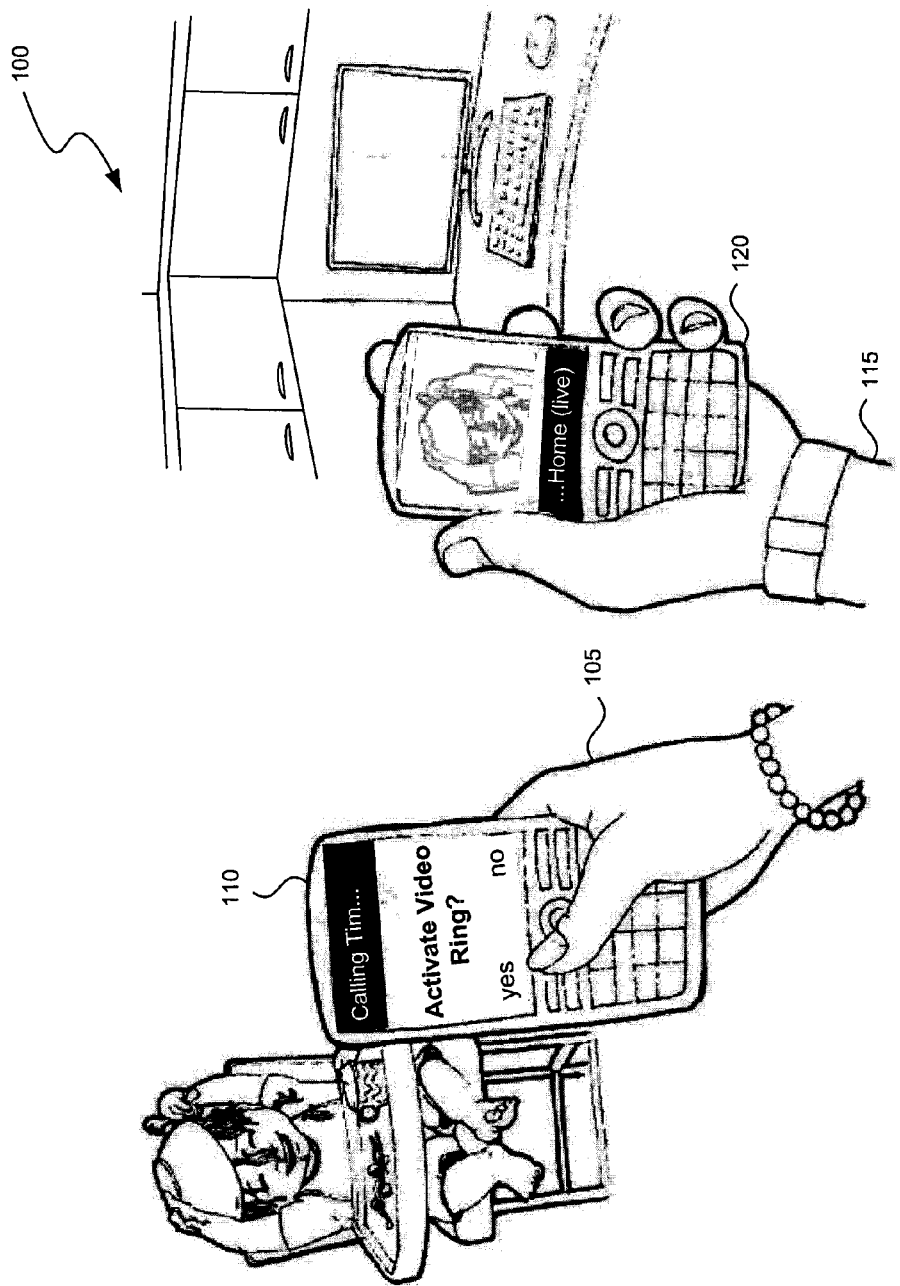
FIG. 1 is a pictorial diagram illustrating a scenario in which a system transmits context data before connecting a voice call.

FIG. 1 depicts a scenario 100 in which a system transmits context data before connecting a voice call between two users of mobile devices. A wife 105 wants to call her husband 115 at his office, but knows that he may be busy or often does not pick up his mobile device unless he is expecting a call. However, she wants to express a level of urgency of the call. Therefore, she launches an application on her mobile device 110 that attaches a context to a voice call. She takes a picture of her situation (a picture of her child wearing his dinner), and presses a button to initiate a voice call to her husband. The application transmits a message from her mobile device to her husband's mobile device 120 while attempting to establish the voice call. The mobile device 120 receives an indication of the voice call along with the picture, and informs the husband 115 of the voice call (via interface elements or audible ring) while also displaying the picture of the dinner wearing child). The husband 115 may then answer the voice call knowing the context of the call.

Suitable System

Figure 2:
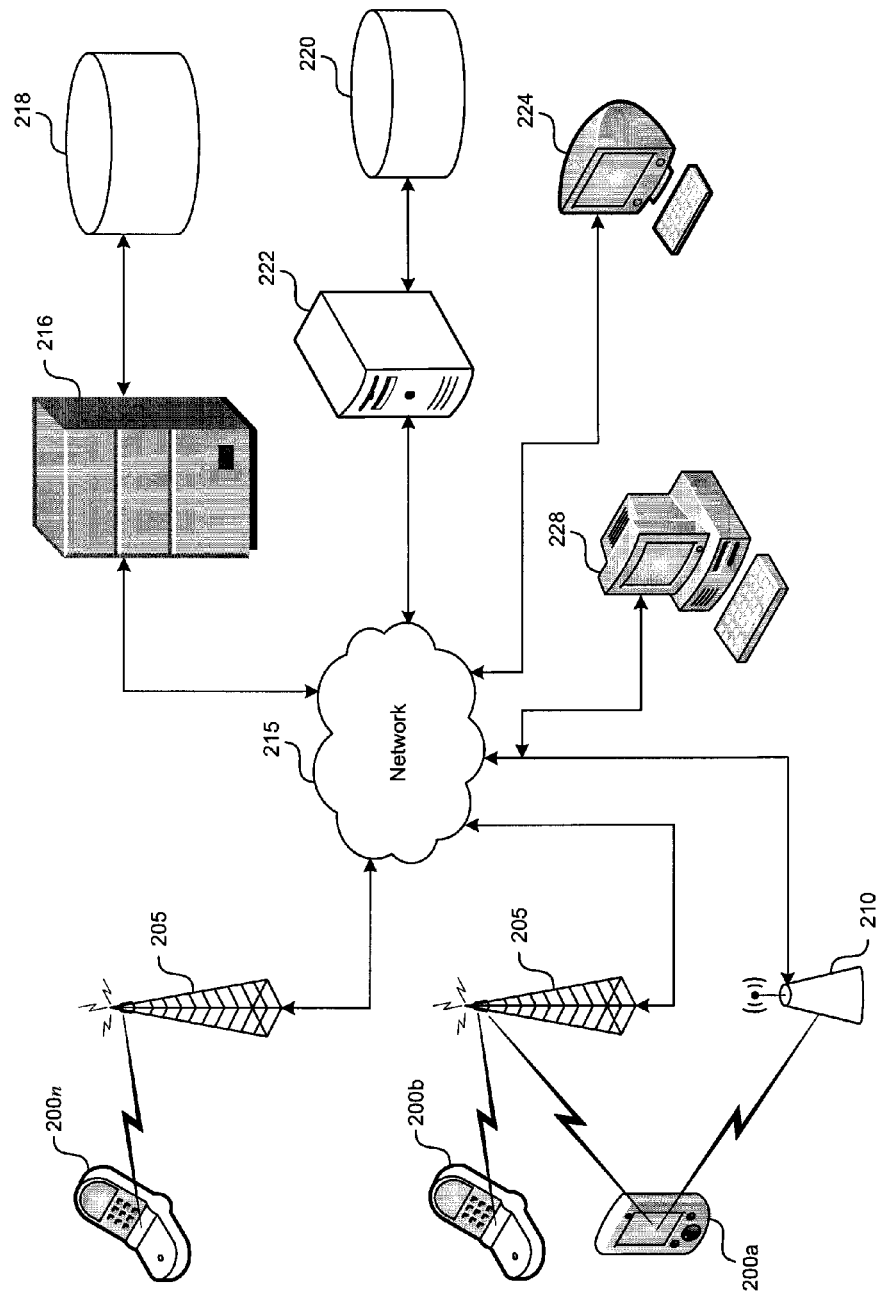
FIG. 2 is a block diagram illustrating a system for presenting context information with a voice call.

FIG. 2 and the following discussion provide a brief, general description of a suitable environment in which the system can be implemented. Although not required, aspects of the system are described below in the general context of computer-executable instructions, such as routines executed by a general-purpose data processing device, e.g., a wireless device, server computer or personal computer. Those skilled in the relevant art will appreciate that the system can be practiced with other communications, data processing, or computer system configurations, including: Internet appliances, hand-held devices (including personal digital assistants (PDAs) and digital music players), all manner of mobile phones, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor. Aspects of the system may be stored or distributed on computer-readable media, including magnetically or optically readable computer discs, hard-wired or preprogrammed chips (e.g., EEPROM semiconductor chips), or other data storage media.

While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

As shown in FIG. 2, a mobile telecommunications device 200a, 200b . . . 200n, such as a mobile phone, media device, email device, or the like, may communicate with servers or other computing devices via a mobile telecommunications network or other wireless telecommunications network. For example, a mobile device 200b may establish a communication channel with a mobile transceiver 205 using any known standard, such as GSM, CDMA, GPRS, EDGE, 3G, UMTS, UMA, and so on. Alternatively or additionally, a mobile device 200a may establish a communication channel via a wireless local area network (WLAN) using a wireless hotspot or access point 210. The wireless access point 210 may employ any known wireless communication protocols, such as IEEE 802.11 or IEEE 802.16. The mobile device may communicate with the access point 210 using the Unlicensed Mobile Access (UMA) or the Generic Access network (GAN) protocol. The mobile transceivers and access points are connected via public and/or private networks 215 to remote services operating on servers and other computing devices.

Content and other information transmitted between mobile devices via the network may be stored locally on the mobile devices 200a-n or at a network location that is associated with the mobile devices. For example, photographs and videos transmitted as context information may be stored in a database 218 associated with a web server 216, in a third party database 220 associated with a third party web server 222, in a personal computer 224, in a third party computer 228, or in another mobile device.

The databases and servers may also store information about the mobile devices, such as identifiers, group or permissions information, and so on. Examples of stored identifiers include Integrated Services Digital Network (MSISDN) numbers, mobile identification (MIN) numbers, International Mobile Subscriber Identity (IMSI) numbers, and so on. For example, a service provide associated with the mobile device may associated various devices in groups, such as a user's group of friends or contacts and/or a group of users within an associated address book, such as a network address book (NAB). The network address book (NAB), which may reside within the databases, is configured to synchronize data stored on mobile devices within the network. The data may be taken from various social networking platforms, such as Facebook, MySpace, Twitter, and so on. In other words, the NAB stores contact information from a variety of different social networks for a mobile device, which may not provide software specific to the social networks. The network may transmit data from the NAB to the mobile device for storage and/or to update previously forwarded and locally stored data in the mobile device. The data forwarded from the NAB to the mobile device may be stored in a phonebook, contact list, or similar internal memory of the mobile device. Further details regarding the Network Address Book and associated systems and processed may be found in U.S. patent application Ser. No. 12/406,050, filed on Mar. 17, 2009, entitled SYSTEM AND METHOD FOR TELECOMMUNICATION WITH A WEB-BASED NETWORK, SUCH AS A SOCIAL NETWORK, which is incorporated by reference in its entirety.

Another example of a group of users is a group created by a user. In some examples, a provider's service plan allows users, or subscribers, to create a contact group containing a limited number of people or services. Communications to and/or from the people or services in the contact group are billed at a reduced rate (e.g., all communications are free, all communications are billed at a fixed monthly fee, all communications are billed at a reduced rate). The subscriber is allowed to periodically change the members of the contact group, with the service plan's billing scheme being applied to the new members in the contact group as soon as any change is made. Certain rules are applied to the composition of the contact group, including the allowed frequency of updates to the group, thereby constraining some of the modifications that the subscriber can make to the group. Any modifications to the service plan proposed by the subscriber are therefore verified by the service management system against a set of rules that characterize acceptable changes before being implemented. Further details may be found in U.S. patent application Ser. No. 11/400,925, filed on Apr. 10, 2006, entitled PREFERRED CONTACT GROUP CENTRIC INTERFACE, which is incorporated by reference in its entirety.

The network may also include one or more location determination components or devices that detect the location of mobile devices within the network. In some cases, these location determination components may be geoservers, which track a target area within the network to identify the locations of mobile devices that enter the target area.

Transmitting Context Information During Voice Calls

Figure 3:
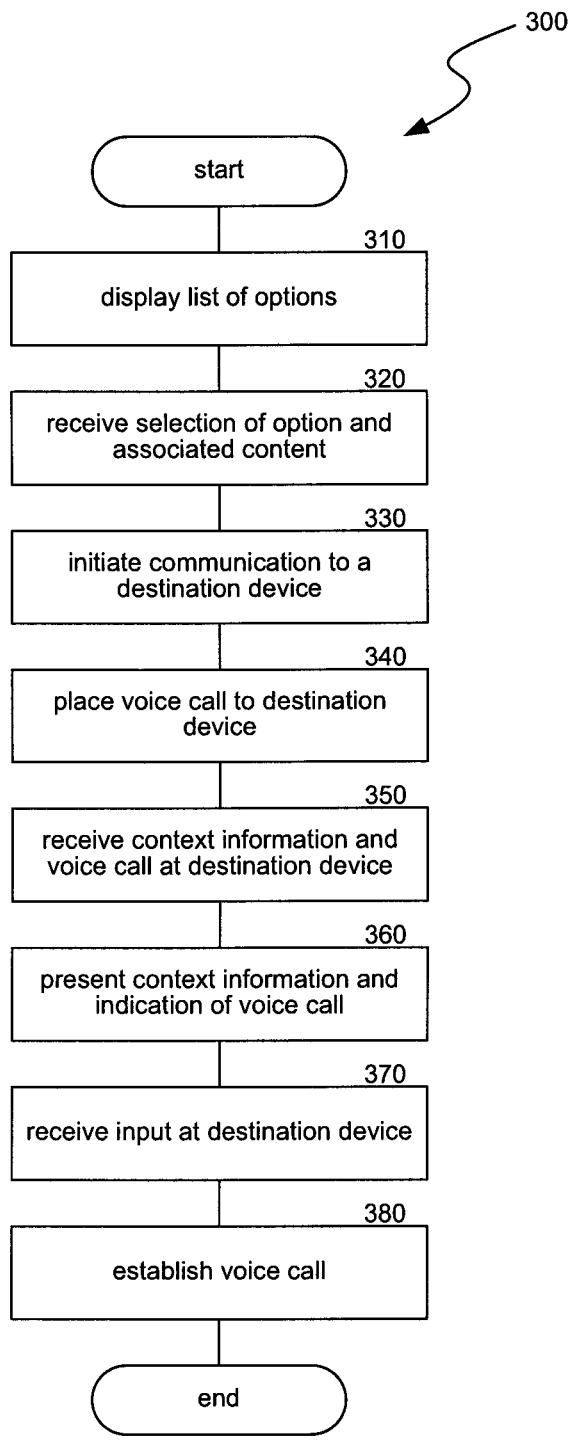
FIG. 3 is a flow chart illustrating a routine for presenting context information during establishment of a voice call.

As discussed herein, the system facilitates the presentation of context information when a user receives a call at his/her mobile device. Referring to FIG. 3, a flow chart illustrating a routine 300 for presenting context information during establishment of a voice call is shown. In step 310, upon receiving an indication at a calling mobile device to begin a voice call, the system displays a list of options via the mobile device interface to provide context information during establishment of the voice call. The displayed list may include options to send a picture, a video, a text-based message, and so on.

The system may receive a request to begin a voice call in a number of ways, such as within other communications applications. The system, via software and other components on a mobile device, may present an interface element capable of receiving input from a user that prompts the mobile device to initiate a voice call. For example, two users may be sending text messages back and forth, and after a certain number of text messages, one of the users may wish to call the other user. The system may present an option to call the other user during the text messaging session so as not to require a user to exit out of the text messaging session in order to initiate the call. Other communications applications that may facilitate automatically initiating voice calls include email applications, instant messaging applications, and so on. The system may also receive a request for a voice call within other applications provided by a mobile device. Examples include applications that play music, applications that take pictures, applications that take videos, and so on.

In step 320, the calling mobile device receives a user selection of one of the options, along with input related to the selected option. As described herein, the calling mobile device may receive various types of input in a number of different ways, including:

receiving text-based input via a open ended text box or via a user-selectable list of pre-defined text phrases, receiving a photograph or picture taken by a camera associated with the device, receiving a video taken by a video recorder associated with the device, taking a picture of a user and decoding the picture to determine an emotional state of the user, which provides input in selecting context information to be sent, automatically selecting content based on a variety of factors, including time-based factors (such as a time when a voice call is requested), location-based factors (such as a location of a mobile device when a voice call is requested), a status of a user or the device, and so on.

In step 330, the calling mobile device initiates communications to a destination mobile device. The calling mobile device may first establish a signaling or messaging connection to the destination mobile device in which to transmit the context information. For example, the calling mobile device initiates a Session Initiation Protocol (SIP) connection used to set up a communication session with a destination mobile device. The SIP connection may facilitate the transmission of content (such as context information) between devices, may cause or trigger a device to perform a function, launch an application stored on the device, and so on.

In step 340, the calling mobile device places a voice call to the destination mobile device. The calling mobile device may use the SIP channel during initiation of the voice call in order to prepare a destination mobile device to display transmitted context information along with an indication of the placed voice call. In some cases, the system may delay placing the voice call a certain time period after transmission of the context information. For example, the system may transmit the context information at a first time, and place the voice call a few seconds later than the first time in order to give a user at the destination mobile device time to review the context information before deciding whether or not to handle the call.

In step 350, the destination mobile device receives the context information and an indication of the placed voice call from the calling mobile device. In step 360, the destination mobile device presents the context information along with an indication of a received voice call, and one or more options requesting guidance in handling the call. For example, code, scripts, and other data residing in the destination mobile device may access API's for the device's operating system to display information received over the SIP connections (such as photos, videos, and so on) via the device's interface (e.g., as wallpaper for the interface), in addition to other displayed information, such as the calling party.

In some cases, the system may store some or all received context information in a database on the mobile device, in a database within the network, or in other locations. For example, a user may wish, at a later time, to review photos received during initiation of voice calls from a specific user, or may wish to stored content to resend at a later time.

The destination mobile device may present the information along with an indication of the voice call, may present the context information along with a list of call-handling options, and/or may present the context information before presenting an indication of the placed voice call. Further details regarding the presentation and handling of received calls at destination mobile devices are discussed herein.

In step 370, the destination mobile device, via the interface, receives a selection of one of the options. For example, a user may review the context information (such as watch a short video) and select an option to answer the call. Alternatively, the user may watch the video and decide to ignore the call, or request additional information. In step 380, upon receiving a selection to accept the voice call, the destination mobile device connects to the calling mobile device, establishing a voice call.

Figure 4C:
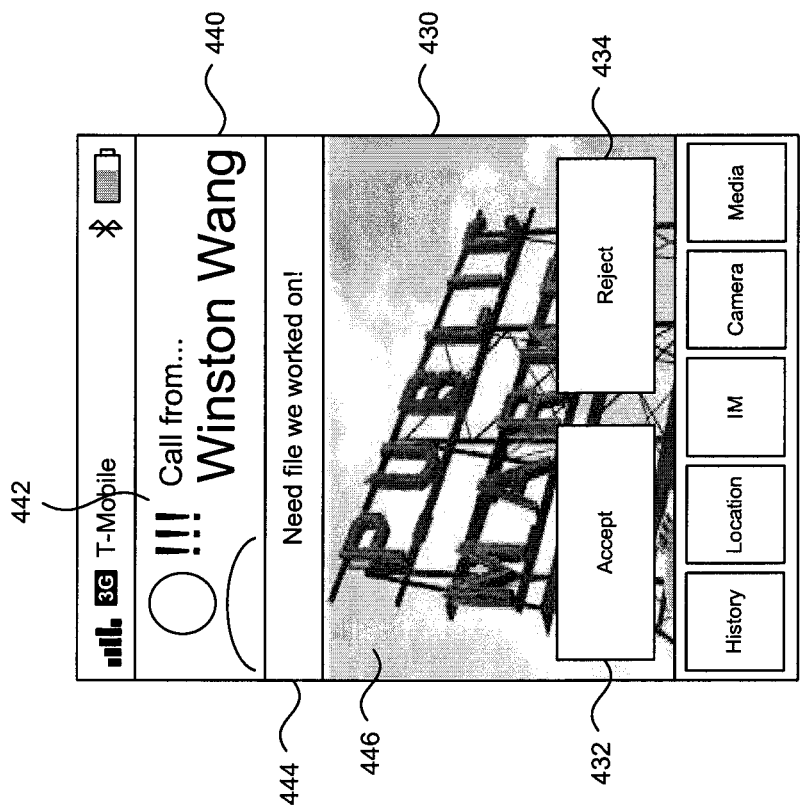

Referring to FIGS. 4A-4C, screen shots of representative interfaces displayed during establishment of a voice call between two mobile devices are shown. FIG. 4A depicts a contact list displayed by the system via a screen 400 of a calling mobile device. The contact list includes a number of entries, including an entry 410 for "Holt, Adam." The entry 410 also includes an icon 415, picture or animation that facilitates adding context information when the calling mobile device places a voice call to Adam Holt. For example, a user wants to call his friend Adam Holt, and selects the icon 415 in order to add context information to the voice call in and provide Adam Holt with information about the voice call.

Upon receiving the selection of the icon 415, the system presents a number of user-selectable options on the screen 400 that facilitate entry of context information. The system may present pre-defined elements 420 (such as graphical objects associated with a level of urgency for a voice call) and/or text entry elements 422. The text entry elements may be text boxes that receive textual input from a user, drop down menus that present a limited number of user-selectable phrases, or other elements. For example, a drop down menu may present a list of frequently chosen phrases such as "Just calling to say hi," "call me back, it's urgent," "I have a quick question about something," and so on. The system may also present one or more user-selectable options that facilitate receiving media as the context information. The system may include an option 424 to select or take pictures or photographs, an option 426 to select or take a video, and/or other options 428 (such as options to record an audio introduction to a call, options to change the display of a destination device, and so on).

For example, the system receives from a user a selection of option 424, indicating that the user wishes to use a picture when providing context information with a voice call. The system may automatically launch an application on the calling mobile device that enables a user to take a picture using his/her mobile device. The user takes a picture, and the system initiates a voice call to Adam Holt that includes the picture as the related context information.

Once an option is selected, the system transmits the context information and initiates a voice call to a destination mobile device. Upon receiving the context information and the voice call, the destination mobile device, via screen 430, presents an indication of a received voice call 440 along with context information about the voice call. That is, code stored on the destination mobile device may cause the device to receive the context information, access API's for the device's operating system, and display the received context information. For example, the destination mobile device presents an icon 442 indicating a level of urgency, a message 444 about the voice call, and a picture or image 446 indicating a location of the calling mobile device. The destination mobile device also presents call handling options, including an option 432 to accept the voice call and an option 434 to reject the voice call.

For example, the destination mobile device receives an indication of a voice call and the context information over a SIP connection established between the destination mobile device and a calling mobile device. The destination mobile device, when informing a user that the call was received, displays the context information to the user along with call handling options. The user can then decide whether or not to take the call from the context information.

Of course, these screens are representative of some cases in which the system facilitates presenting context information during establishment of voice calls. Other are of course possible. The following examples illustrate other implementations of the system:

As discussed briefly herein, the system may facilitate establishing a voice call during use of another application, such as a messaging application. For example, a user may be sending emails back and forth to a co-worker, and the content of the emails may escalate to the point where a voice call is needed. Within an interface that displays the email application, a mobile device may present an option to initiate a voice call. The user selects the option, and the mobile device establishes a SIP connection with the co-worker's mobile device (or other telecommunications device, such as a telephone on a PSTN or VoIP network). The calling mobile device may then send over the SIP connection a portion of the email conversation as context information when establishing the voice call, such as the subject line of the email thread. A similar example may apply to an instant messaging or texting (SMS/IMS) session.

The system may facilitate establishing a voice call during use of a non-communication application. For example, a user is taking pictures on his vacation, and wants to call a friend of his to tell him about the trip. Within an interface that facilitates picture taking, the system presents an option to place a voice call. The user takes a picture and selects the voice call option. The mobile device initiates a voice call to his friend's mobile device, sending the picture as context information to be displayed along with (e.g., behind) an indication of the voice call. The friend, not knowing the user is on vacation, sees the picture and instantly answers the call.

The system may automatically select content when providing context information during establishment of a voice call between devices. For example, a user is traveling to visit a friend in Portland, and initiates a voice call to his friend when he is half way through the trip and in Seattle. The system identifies the location of the user's mobile device, and retrieves an image (such as the image 446) associated with Seattle from a database accessible to the network that relates images and other content to location information (such as a POI database). For example, the system identifies the GPS coordinates of the device, reviews a database of iconic images in relation to GSP coordinates, and selects an image that matches the coordinates of the mobile device. The user's mobile device initiates a voice call to the friend in Portland, sending the retrieved image to be displayed along with an indication of the voice call. The friend, expecting the user to already be in Portland, answers the call to find out why the user is delayed because he sees the image of Seattle.

Requesting Information from Calling Parties

Figure 5:
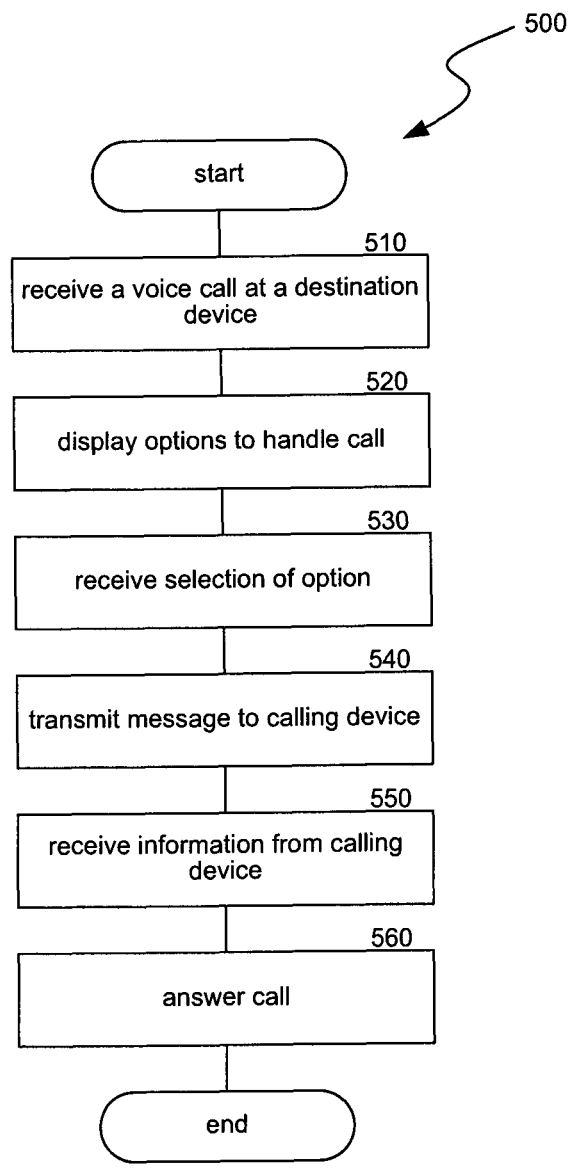
FIG. 5 is a flow chart illustrating a routine for requesting information from an unknown calling party during reception of a voice call.

As discussed briefly herein, in some examples the system facilitates a called party requesting information from a calling party. Referring to FIG. 5, a flow chart illustrating a routine for requesting information from an unknown calling party during reception of a voice call is shown. In step 510, a destination mobile device receives a voice call. For example, the destination mobile device receives a typical voice call without any context information. The calling party may be known to the destination mobile device (e.g., information about the calling party may be in a contact list) or may be unknown to the destination mobile device.

In step 520, the destination mobile device, via a screen or other interface, displays options related to handling the call. These options may include an option to accept the call, an option to ignore or reject the call, and an option to request information from the calling party.

In step 530, the destination mobile device receives a selection of one of the options. For example, a user selects an option to request more information. In step 540, the destination mobile device transmits a message to the calling mobile device requesting additional information. The destination mobile device may transmit the message over a SIP connection, SMS channel, USSD channel, or other messaging channels. The destination mobile device may automatically select a message from one or more messages stored in the device, or may display an interface that enables a user of the device to input a message (such as an interface similar to the interface shown in FIG. 4B).

In step 550, the destination mobile device receives information, such as context information, from the calling mobile device. The destination mobile device may then present the information to a user of the device along with the previously presented call handling options. In step 560, the destination mobile device receives a selection of one of the options, and depending on the selection, answers or ignores the call.

Figure 6:
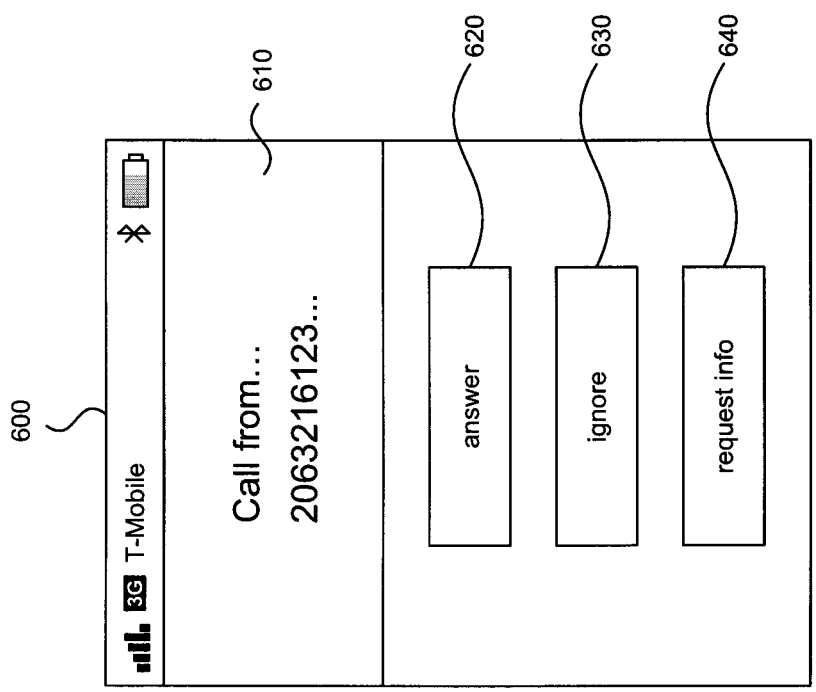
FIG. 6 is a screen shot of a representative interface displayed during reception of a voice call from a calling party.

FIG. 6 is a screen shot of a representative interface 600 displayed during reception of a voice call from a calling party. A destination mobile device may display this screen when the device receives a call without context information or receives a call from an unknown device. The destination mobile device, via the interface 600, presents information 610 about the voice call, and a number of user-selectable call handling options. These options include an option 620 to answer the call, an option 630 to ignore the call, and an option 640 to request information from the calling mobile device.

For example, a destination mobile device receives a call from a calling mobile device that is not in a contact list associated with the device. Receiving the call triggers the destination mobile device to launch an application that provides the user with handling options other than the traditional handling options. The application handles the voice call and displays a user-selectable element that, when selected, causes the destination mobile device to transmit a message to the calling mobile device requesting context information. The destination mobile device receives a message back from the calling mobile device, and presents the information along with the previously presented call handling options. The user can then decide whether or not to answer the call based on the presented context information.

Other Examples and/or Implementations of the System

In some cases, the system may transmit timing information or a countdown timer as the context information. For example, the system may send to a destination mobile device a message saying "Joe, will call you in 10 minutes," which alone or with an associated flag, cause the device to start a timer that counts down the 10 minutes and displays the status of the timer to the user. The calling device may also start a timer. The system may then automatically establish the voice call when the timer reaches zero.

In some cases, the system may facilitate the entry of context information after a voice call is unsuccessfully established. For example, a user may place a call to a friend and add context information, but the call is not answered and the destination mobile device forwards the call to the friends' voice mail. The user hangs up without leaving a voice mail. The system, receiving an indication of the unsuccessful call, presents an interface to the user asking if the user would like to send a text message instead. The user selects yes, and the system generated a text message, including the added context information, and sends the text message to the destination mobile device.

In some cases, the transmitted information during establishment of a voice all may include instructions that cause a destination mobile device to perform a function. Examples include:

Instructions that cause the destination mobile device to take a picture or record a video of a user that receives the voice call (e.g., in order to record the reaction of the user to the voice call). The instructions may also prompt the destination mobile device to send an MMS back to a calling mobile device with the picture to show the calling party the called party's reaction.

Instructions that cause the destination mobile device to play a certain ring tone or audio clip based on the context of the call. For example, a doctor may have an urgent matter to discuss with a patient, and the doctor sends instructions to the patient's phone to play a ring tone that indicates the urgency of the call.

Instructions that cause the destination mobile device to play a ring tone for a certain period of time. For example, a wife at work may call her husband at home to let him know when she is coming home. The wife knows the husband leaves his mobile device at random locations in the house. When placing the call, the wife selects an option to send instructions to the husband's mobile device to play the ring tone twice as long in order to allow the husband to find his mobile device in time to accept the call.

Instructions that cause the destination mobile device to play a subsequent alert at a destination mobile device after the device receives a connection request, a text message, an email message, an instant message, and so on, and a user of the device does not reply within a certain time period.

In some cases, the system may facilitate the transmission of context information to multiple users at multiple destination devices. For example, a user may set up a conference call and send context information about the call (such as a subject of the call) to all parties on the call. In some cases, a user (e.g., a leader of the call), may periodically transmit new information or refresh the context information during the conference call. For example, the conference call may be long, and not all users will want to attend the entire call. Refreshing the context information allows the users to identify a discussion topic during the call, and enter or exit the call when appropriate based on guidance from the context information.

In some cases, a service provider that provides aspects of the system to its subscribers may bill users based on instances in which they send context information, instances in which they receive context information, and so on. However, the service provider may also enable users to refuse the receipt of context information, or to selectively refuse the receipt of context information, depending on their needs.

CONCLUSION

From the foregoing, it will be appreciated that specific examples of the system have been described herein for purposes of illustration, but that various modifications may be made without deviating from the spirit and scope of the system. For example, while Table 1 shows a table whose contents and organization are designed to make them more comprehensible by a human reader, those skilled in the art will appreciate that actual data structures used by the system to store this information may differ from the table shown, in that they, for example, may be organized in a different manner, may contain more or less information than shown, may be compressed and/or encrypted, and so on. As another example, the blocks shown in FIGS. 3 and 5 may be altered in a variety of ways. The order of the blocks may be rearranged, blocks may be performed in parallel, blocks may be omitted, or other blocks may be included. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the system provided herein can be applied to other systems, not necessarily the system described above. The elements and acts of the various examples described above can be combined to provide further implementations of the system.

Other changes can be made to the system in light of the above Detailed Description. While the above description describes certain examples of the system, and describes the best mode contemplated, no matter how detailed the above appears in text, the system can be practiced in many ways. Details of the system may vary considerably in its specific implementation, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A method in a mobile device for transmitting context information during establishment of a voice call to a destination device, the method comprising:
   receiving a request from a user of the mobile device to initiate a voice call to a destination device,
      wherein the request is received, in part, via an application on the mobile device that captures video or images, or receives text input;
   receiving input associated with a type of context information related to the application that captures video or images, or receives text input;
   establishing a session initiated protocol communication session between the mobile device and the destination device;

receiving, from the destination device, a request for context information,
  wherein the received request for context information includes a picture taken at the destination device and transmitted from the destination device,
  wherein the received request for context information includes a message transmitted from the destination device, and
  wherein the picture and context information are transmitted from the destination device prior to the user accepting or declining the voice call;
transmitting context information over the session initiated protocol communication session, wherein the context information is associated with the received input to the destination device; and
initiating a voice call to the destination device over the session initiated protocol communication session a certain time period after transmission of the context information to the destination device.

2. The method of claim 1, wherein receiving the request from the user of the mobile device to initiate the voice call to the destination device includes receiving a request via a list of contacts from a network address book and displayed to the user via an interface of the mobile device.

3. The method of claim 1, wherein receiving the request from the user of the mobile device to initiate the voice call to the destination device includes receiving a request during a session within a messaging application, and wherein receiving input from the user associated with the type of context information related to the application that captures video or images, or receives text input includes receiving at least a portion of one or more messages sent or received by the user within the messaging session.

4. The method of claim 1, wherein receiving input from the user associated with the type of context information related to the application that captures video or images, or receives text input automatically causes the mobile device to initiate the voice call and including at least a portion of the received input to the destination device.

5. The method of claim 1, further comprising:
  when the initiated voice call is not established, transmitting a message from the mobile device to the destination device that includes at least a portion of the context information.

6. A method at a mobile device for requesting information from a calling mobile device, the method comprising:
  receiving, at a destination mobile device, an indication of a voice call placed from a calling mobile device to the destination mobile device;
  automatically launching an application at the destination mobile device that presents an interface of user-selectable options, including:
    an option to accept the voice call;
    an option to decline the voice call; and
    an option to request more information from a calling party of the voice call;
  receiving a selection of the option to request more information from the calling party of the voice call;
  performing an action based on the selection of the option to request more information from the calling party of the voice call,
    wherein the action includes automatically sending a request to the calling party for more information,
    wherein, prior to accepting or declining the voice call, performing the action comprises:
      taking a picture at the destination mobile device,
      transmitting the picture to the calling mobile device, and
      transmitting a message, to the calling mobile device, requesting context information, and
    wherein the message is a predefined message for requesting context information; and
  receiving context information from the calling mobile device in response to the transmitted message.

7. The method of claim 6, wherein the calling mobile device is not in a list of contacts associated with the destination mobile device.

8. The method of claim 6, wherein performing an action based on the selection of one of the presented options includes:
  generating a message at the destination mobile device, wherein the message includes contents requesting information from the calling mobile device; and
  transmitting the message to the calling mobile device.

9. A non-transitory tangible computer-readable medium whose contents cause a mobile device to perform a method for requesting information from a calling mobile device, the method comprising:
  receiving, at a destination mobile device, an indication of a voice call placed from a calling mobile device to the destination mobile device;
  automatically launching an application at the destination mobile device that presents an interface of user-selectable options including an option to request more information from the calling party of the voice call;
  receiving a selection of the option to request more information from the calling party of the voice call;
  performing an action based on the selection of the option to request more information from the calling party of the voice call,
    wherein the action includes automatically sending a request to the calling party for more information,
    wherein, prior to accepting or declining the voice call, performing the action comprises:
      taking a picture at the destination mobile device,
      transmitting the picture to the calling mobile device, and
      transmitting a message requesting context information to the calling mobile device, and
    wherein the message is a predefined message for requesting context information; and
  receiving context information from the calling mobile device in response to the transmitted message.

10. The non-transitory computer-readable medium of claim 9, wherein the calling mobile device is not in a list of contacts associated with the destination mobile device.

11. The non-transitory computer-readable medium of claim 9, wherein performing an action based on the selection of one of the presented options includes:
  generating a message at the destination mobile device, wherein the message includes contents requesting information from the calling mobile device; and
  transmitting the message to the calling mobile device.

12. A system for transmitting context information during establishment of a voice call from a mobile device to a destination device, the system comprising:
  means for receiving a request from a user of a mobile device to initiate a voice call to a destination device,
    wherein the request is received, in part, via an application on the mobile device that captures video or images, or receives text input;

means for receiving, from the destination device, a request for context information,
- wherein the received request for context information includes a picture taken at the destination device and transmitted from the destination device,
- wherein the received request for context information includes a message transmitted from the destination device, and
- wherein the picture and context information are transmitted from the destination device prior to the user accepting or declining the voice call; and means for transmitting context information when establishing the voice call between the mobile device and the destination device, including:
- means for receiving input associated with a type of context information related to the application that captures video or images, or receives text input; and
- means for causing the mobile device to initiate a voice call including context information associated with the received input to the destination device.

13. A system for providing information in connection with voice and/or text-based communications between at least first and second mobile telecommunications devices, wherein the first and second mobile telecommunications devices are associated with users of at least one wireless telecommunications network, the system comprising:

at least one network server computer, coupled to the wireless telecommunications network,
- wherein the network server computer is configured to facilitate communications between the first and second telecommunications devices; and at least one database configured to communicate with the network server computer, wherein the database stores a table of contacts for the users and content, wherein the table stored in the database includes, for each user:
- an identifier associated with the user or a mobile telecommunications device of the user, and,
- at least one network address associated with each contact for the user, wherein the network address permits the mobile telecommunications device to place a voice communication to, or enabling text-based communications with, a telecommunications device associated with the user's contact, and,
- at least a digital photograph, graphic, animation, or video associated with at least some of the contacts for the user, wherein the content stored in the database includes digital images or information, and geographic coordinates associated with the digital images or information, and, wherein the network server computer is configured to:
- receive a call from the first telecommunication device for the second telecommunications device,
- determine a geographic location of the first telecommunication device,
- obtain from the table stored in the database a digital photograph, graphic, animation, or video associated with the user of the first telecommunications device,
- obtain from the content stored in the database a digital image or information having geographic coordinates near to the determined geographic location, and
- route the call to the second telecommunications device with the obtained digital photograph, graphic, animation, or video associated with the user, and with the obtained digital image or information, both for display on the second telecommunications device while the second telecommunications device is ringing to announce the call.

14. The system of claim 13, wherein the identifier is a Mobile Subscriber Integrated Services Digital Network (MSISDN) number, mobile identification (MIN), or International Mobile Subscriber Identity (IMSI) number, and wherein the network address is a phone number and an instant messaging handle or email address.

15. The system of claim 13 wherein the digital images are iconic digital photographs associated with predetermined geographic coordinates, and wherein the network server provides a SIP or IMS communication to the second telecommunications device during the routing of the call.

16. The system of claim 13, wherein the network server is configured to establish a voice call between the first and second telecommunication devices during a text-based communication session between the first and second telecommunication devices, wherein the voice call includes a display announcing during ringing of the call a text message obtained from a portion of the text-based communication session between the first and second telecommunication devices.

17. The method of claim 6, wherein the request to the calling party for more information includes a request for a level urgency for the voice call.

* * * * *